United States Patent
Bousset et al.

(10) Patent No.: US 9,211,868 B2
(45) Date of Patent: Dec. 15, 2015

(54) HYDRAULIC CONNECTOR FOR A WINDSHIELD WIPER BLADE HAVING GUIDANCE BY LATERAL PROTUBERANCES

(75) Inventors: Xavier Bousset, Mezel (FR); Gérald Caillot, Cernay la Ville (FR); Vincent Izabel, Chilly Mazarin (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 274 days.

(21) Appl. No.: 13/989,531

(22) PCT Filed: Sep. 26, 2011

(86) PCT No.: PCT/EP2011/066678
§ 371 (c)(1),
(2), (4) Date: Jul. 23, 2013

(87) PCT Pub. No.: WO2012/072302
PCT Pub. Date: Jun. 7, 2012

(65) Prior Publication Data
US 2013/0298346 A1  Nov. 14, 2013

(30) Foreign Application Priority Data
Feb. 12, 2010  (FR) ..................... 10 04686

(51) Int. Cl.
| B60S 1/38 | (2006.01) |
| B60S 1/40 | (2006.01) |
| B60S 1/52 | (2006.01) |
| B60S 1/48 | (2006.01) |

(52) U.S. Cl.
CPC ............. *B60S 1/40* (2013.01); *B60S 1/3862* (2013.01); *B60S 1/4048* (2013.01); *B60S 1/48* (2013.01); *B60S 1/524* (2013.01); *B60S 1/3805* (2013.01); *B60S 1/3806* (2013.01)

(58) Field of Classification Search
CPC .............................. B60S 1/3862; B60S 1/524
USPC ....................................... 15/250.04
See application file for complete search history.

(56) References Cited

U.S. PATENT DOCUMENTS

| 8,381,348 B2 * | 2/2013 | Egner-Walter et al. ..... 15/250.04 |
| 2003/0009841 A1 * | 1/2003 | Sato ........................... 15/250.04 |

FOREIGN PATENT DOCUMENTS

| DE | 10 2007 062304 A1 | 6/2009 | |
| DE | 102008021457 A1 * | 11/2009 | ................ B60S 1/48 |

(Continued)

OTHER PUBLICATIONS

International Search Report issued in PCT/EP2011/066678 mailed on Oct. 19, 2011 (6 pages).

*Primary Examiner* — Mark Spisich
*Assistant Examiner* — Andrew A Horton
(74) *Attorney, Agent, or Firm* — Osha Liang LLP

(57) ABSTRACT

The invention relates to a hydraulic connector for a wiper system, said wiper system also comprising an arm intended to move a blade over the surface to be wiped, a blade (3) and a mechanical connector (10) fixed to said blade in order to attach it to the arm and able to be attached to the arm in a longitudinal movement with respect to said arm, said hydraulic connector (30) having at least one line (31, 32) for supplying a liquid to the blade (3) via the mechanical connector (10). Said hydraulic connector is characterized in that it comprises at least one protuberance (35) able to bear against un element (2*a*, 2*b*) of said wiper system in order to align the hydraulic connector (30) on the mechanical connector (10) during said longitudinal movement.

12 Claims, 3 Drawing Sheets

(56) References Cited

FOREIGN PATENT DOCUMENTS

| | | | |
|---|---|---|---|
| DE | 102008049269 A1 * | 4/2010 | ............... B60S 1/40 |
| JP | 2003-341484 A | 12/2003 | |
| WO | 2010/006776 A1 | 1/2010 | |
| WO | 2010/034447 A1 | 4/2010 | |
| WO | 2010034445 A1 | 4/2010 | |

* cited by examiner

HYDRAULIC CONNECTOR FOR A WINDSHIELD WIPER BLADE HAVING GUIDANCE BY LATERAL PROTUBERANCES

The field of the present invention is that of equipment for motor vehicles and, more particularly, that of equipment for wiping the windows of motor vehicles.

Motor vehicles are routinely fitted with windshield wiper systems in order to wash the windshield and prevent the vision that the driver has of his environment from being disrupted. These windshield wipers are conventionally driven by an arm making an angular to-and-fro movement and comprise elongate blades, themselves supporting scraper blades made of an elastic material. These blades rub against the windshield and clear away the water bringing it outside the field of vision of the driver. The blades are made in the form either, in a conventional version, of articulated spreader bars which hold the scraper blade in several discrete locations, or, in a more recent version called the "flat blade" version, of a semi-rigid assembly which holds the scraper blade over the whole of its length. In this second solution, the blade is attached to the rotary arm of the windshield wiper by an assembly consisting of a mechanical connector and an adapter. The mechanical connector is a piece which is crimped directly onto the flat blade, while the adapter is an intermediate piece which allows the attachment of the connector to the arm of the windshield wiper. These two pieces are connected to one another by a transverse spindle which allows their relative rotation, in a plane perpendicular to the windshield passing through the arm.

Windshield wipers are also fitted with devices for carrying a windshield washer liquid which is conveyed from a reservoir situated on the vehicle and which is sprayed in the direction of the windshield by nozzles situated either around the windshield or on the windshield wiper itself for a better distribution of the liquid. In the case of nozzles placed on the blades, the windshield-washer liquid is conveyed, before being distributed between them, by pipes which are attached to the arm of the windshield wiper and which are connected to the distribution system of the blade at the mechanical connector by a rigid piece, called the hydraulic connector. These pipes, which are usually flexible and two in number in order to clean both during the outbound and return journey of the blade, emerge in the hydraulic connector, which is attached to the mechanical connector by appropriate fittings and which provides the necessary seal with it. The mechanical connector therefore comprises orifices capable of receiving, by a sealed connection, said fittings of the hydraulic connector.

On models for top-of-the-range vehicles, there are also devices for heating the windshield wiper in order to defrost the blade in the event of severe cold and to prevent it from sticking to the windshield under the action of the frost. These devices, which are more specially adapted to flat blades, usually comprise a heating device incorporated into the assembly carrying the scraper blade and on which electrical resistances are placed. They also require an electrical connection device capable of interacting with the mechanical connector in order to transmit to the heating device the electrical current originating from the vehicle. The electrical connector is usually attached to the hydraulic connector before the latter is fitted to the mechanical connector in order to be attached thereto at the same time as it. Rapid connection devices then provide the contact between the pins of the electrical connector and those of the mechanical connector and finally the contact with the heating resistances of the assembly supporting the scraper blade.

Documents WO2010/034445 and WO2010/034447 show embodiments of mechanical connectors that receive a hydraulic connector through which the liquid of the windshield washer passes. They also show an electrical connector which supplies the mechanical connector with electricity.

While the liquid pipes and the hydraulic connector are usually linked to the arm of the windshield wiper, the mechanical connector is linked to the blade and it is necessary to provide the connection of the hydraulic and, if need be, of the electrical connector, to the mechanical connector when a blade is changed. This operation is usually carried out in a position called the position of service in which the blade is positioned relative to the arm so as to form an angle, by a rotation about the transverse spindle connecting the mechanical connector to the adapter.

It is necessary to make sure that the hydraulic and electrical connectors are correctly aligned during their installation in the mechanical connector, otherwise an incorrect assembly would result in a risk of leakage of windshield-washer liquid at the junction of the two connectors and/or in a bad electrical contact. However, this operation is carried out blind, the hydraulic connector being situated beneath the top portion of the arm, which prevents good visibility of the pieces to be assembled.

It is therefore important to make the insertion of the hydraulic connector into the mechanical connector easier and to ensure that the connection is made correctly, even in the case of an inexperienced operator. The same applies for the electrical continuity to be provided between the pins of the electrical connector and those of the mechanical connector.

The object of the present invention is to remedy these drawbacks by proposing a device making it possible to guide the hydraulic connector during its insertion into the mechanical connector. This guidance function may also ensure the guidance of the electrical connector into the mechanical connector where the latter is first fitted to the hydraulic connector.

Accordingly, the subject of the invention is a hydraulic connector of a wiper system, said wiper system also comprising an arm, notably designed to move a blade over the surface to be wiped, a blade and a mechanical connector attached to said blade for its attachment to the arm and capable of being attached to the arm in a longitudinal movement relative to said arm, said hydraulic connector comprising at least one pipe for and carrying a liquid to the blade by means of the mechanical connector; it is innovative in that it comprises at least one protuberance capable of resting on an element of said wiper system. Such a protuberance therefore serves to align the hydraulic connector on the mechanical connector during said longitudinal movement for fitting the blade on the arm.

The resting of a protuberance against a surface of the terminal piece of the arm allows a correct lateral alignment of the hydraulic connector on the mechanical connector and therefore ensures a correct fitting and a good seal.

According to a first feature, the protuberance extends laterally from the duct. Thus, the protuberance originates on the duct and extends on the side of the latter.

Preferably, the hydraulic connector comprises two protuberances situated on either side of said pipe.

This improves the centering of the hydraulic connector relative to the end of the arm and correlatively relative to the mechanical connector.

In one particular embodiment, the protuberance has the shape of a disk sector extending in a plane parallel to a direction of extension of said pipe. This gives a surface well suited to the guidance of the connector in the terminal piece of the arm. As an example, when the pipe forms a tube of cylindrical section, the direction of extension is formed by a centered straight line of the cylindrical section. The disk sector forms a plate which rests on the lateral inner wall of the terminal piece, it being possible for this disk sector to be complete or partial.

Preferably, the disk sector is linked to said pipe by a bar extending in a plane perpendicular to said pipe.

More preferably, said bar is oriented so as to form a first means of latching the hydraulic connector to the mechanical connector, capable of interacting with a second latching means positioned on said mechanical connector. This securing maintains a good integration of the hydraulic connector on the mechanical connector and a good seal, irrespective of their relative movements generated by the wiping of a glazing element that is not flat.

Advantageously, the hydraulic connector comprises a push-button or a gripping means comprising a face oriented perpendicularly to the direction of extension of said pipe.

In a particular embodiment, the hydraulic connector comprises a means for supporting an electrical connector maintaining the relative orientation of the latter relative to the hydraulic connector during its connection with said mechanical connector. The supporting means is formed by a loop which originates on one face of the hydraulic connector.

The invention also relates to a connection device for connecting a wiper system comprising a terminal piece positioned at the end of an arm designed to move a blade over the surface to be wiped, a blade, a mechanical connector attached to said blade for its attachment to the arm by means of an adapter, said adapter being inserted between the arm and the mechanical connector in order to allow a rotation of the mechanical connector relative to the arm between a position of use and a position of service, characterized in that it comprises a hydraulic connector as described hereinabove, said protuberance resting on an element of the terminal piece.

Advantageously, the mechanical connector supports a second latching means capable of interacting with a first latching means positioned on said hydraulic connector so as to secure the hydraulic connector to the mechanical connector in the position of use.

In a preferred embodiment, the first latching means is a bar which extends in a plane perpendicularly to a direction of extension of said pipe and the second latching means is a tooth positioned at the end of a flexible tongue extending from the mechanical connector. Advantageously, the bar is a piece which connects the protuberance, for example the disk sector, to the hydraulic connector and preferably to the pipe.

Preferably, the adaptor comprises an unlatching means for unlatching the second latching means arranged so as to separate the hydraulic connector from the mechanical connector during the rotation of said adapter from the position of use to the position of service. In this configuration, the securing of the hydraulic connector and of the mechanical connector is still ensured throughout the period of use and the transition to the position of service automatically ensures, notably by rotation of the blade relative to the arm, their separation in order to allow the removal of the blade from the arm.

Preferably, the unlatching means is a finger extending from the lower face of the adapter and situated, in the position of use, beneath and advantageously in the extension of the second latching means, for example the tongue.

The invention will be better understood and other objects, details, features and advantages of the latter will appear more clearly during the detailed explanatory description that follows of an embodiment of the invention given as an example that is purely illustrative and nonlimiting, with reference to the appended schematic drawings.

It should be noted that the figures set out the invention in detail and that they may naturally be used to better define the invention if necessary.

In the rest of the description, the longitudinal or lateral denominations refer to the orientation of the arm to which the windshield wiper blade is fitted. The direction of extension of the arm defining the longitudinal direction, while the lateral orientations correspond to directions oriented in an angular manner or perpendicular to the axis of the arm in its rotational plane. For the longitudinal directions, the outer or inner denominations are understood relative to the point of attachment of the blade to the arm, the inner denomination corresponding to the portion where the arm and a half-blade extend. Finally, the directions referenced as upper or lower correspond to orientations perpendicular to the rotational plane of the arm, the lower denomination containing the plane of the windshield.

Figure 1:
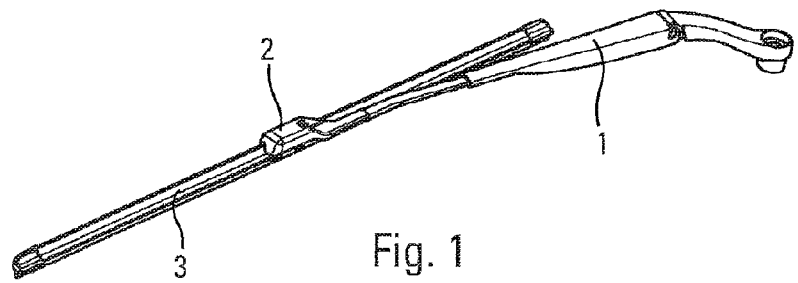
FIG. 1 is an overview, in perspective, of a wiper system for a glazing element of a motor vehicle.
Figure 2:
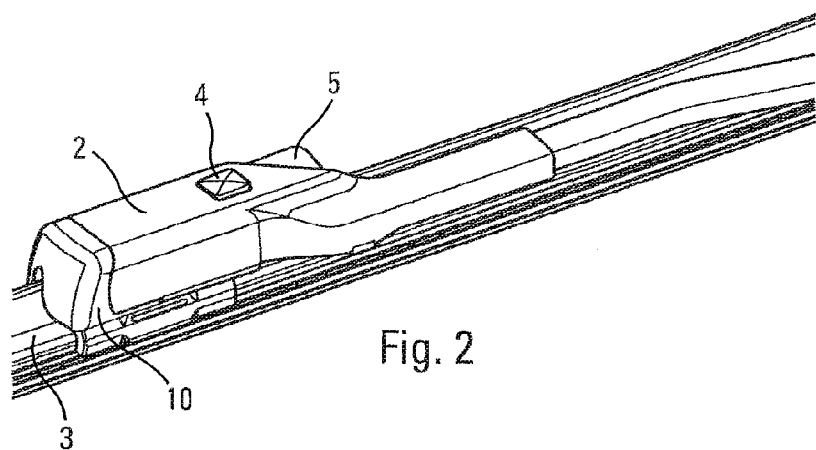
FIG. 2 is a detailed view of FIG. 1 showing the connection between the arm and the blade of the windshield wiper.

With reference to FIGS. 1 and 2, they show a windshield wiper consisting of a blade holder or arm 1 being extended at its outer end by a terminal portion or piece 2, which is usually attached, on the inside, by a crimping onto the arm 1. The terminal piece 2 covers an adapter 20 supporting the blade 3 by means of its mechanical connector 10. The adapter 20 is designed to be inserted into the terminal piece 2 by a movement of translation on the longitudinal axis in order to come into the position of use, where it is positioned in abutment against an interacting shape given to the terminal piece 2. It is then attached thereto in a reversible manner by means of a retractable latching button 4 which interacts with a recess made for this purpose in the upper portion of the terminal piece.

Figure 3:
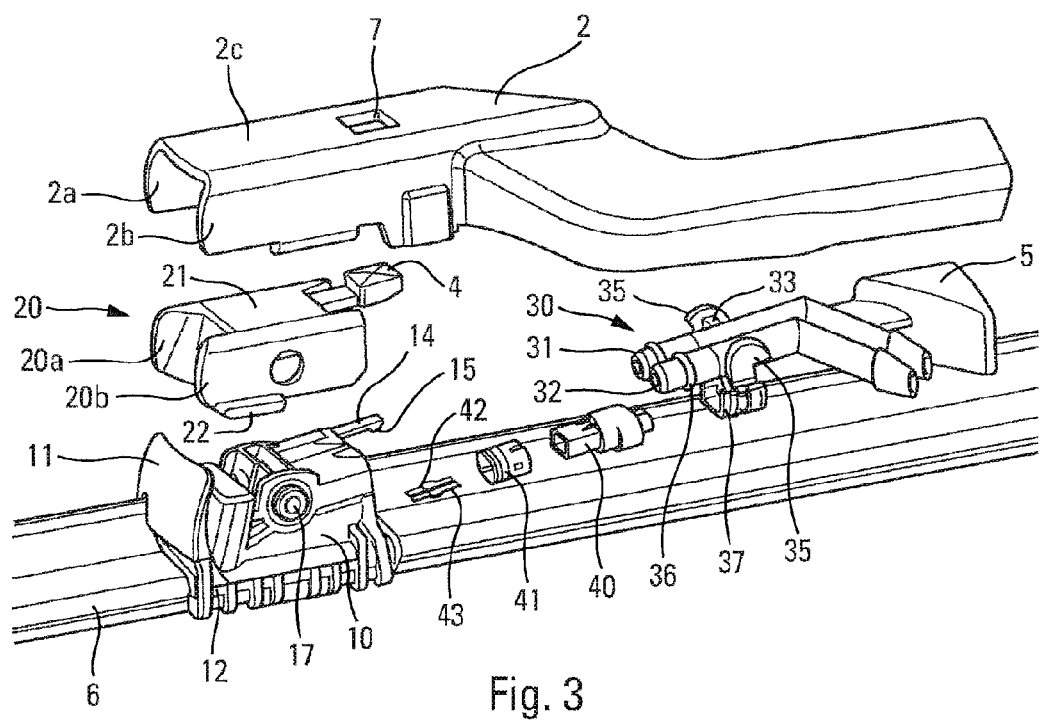
FIG. 3 is an exploded view of a windshield wiper comprising a hydraulic connector according to the invention.

With reference now to FIG. 3, it shows the detail of the elements attaching the blade 3 to the arm 1.

The terminal piece 2 has an inverted "U" shape where the opening of this "U" shape faces the windshield. This terminal piece 2 comprises a base 2c at the upper portion and two lateral branches 2a and 2b extending in the direction of the glazing. Made on the base 2c is an orifice 7 in which the retractable latching button 4 of the adapter 20 is housed. The lower end face of each lateral branch comprises an edge folded at 90° in the direction of the inner volume defined by the base 2c and the branches 2a and 2b, the function of which is, on the one hand, to longitudinally guide the insertion of the adapter 20 and, on the other hand, to serve as an abutment in translation to corresponding abutments placed on the adapter 20.

The adapter 20 has the shape of a yoke, matching the inner volume of the terminal piece 2, so as to be housed in the latter. Two lateral walls 20a and 20b are joined by a bridge 21 and each comprise at their free ends a rim 22 folded toward the outside of the adapter. These rims 22 form a translation abutment when they come to rest against the folded edges of the lateral branches of the terminal piece 2. This adapter 20 also comprises two holes made through the lateral walls 20a And 20b and having the same axis designed to serve as an axis of rotation between the blade 3 and the arm 1 when the wiper system incorporating the hydraulic connector is assembled. Specifically, the blade must have at least one degree of freedom in rotation relative to the arm 1, and more specifically relative to the terminal piece 2, in order to allow the blade 3 to follow the curvature of the glazing element to be wiped and to allow its removal.

The mechanical connector 10 is secured irremovably to the blade 3 so as thereby to transmit the mechanical force originating from the arm 1 to the blade 3. It has a substantially parallelepipedal shape extending along the axis of the blade, with two lateral flanks from which extend laterally two trunnions 17 of which the function is, on the one hand, to secure the mechanical connector to the adapter 20 and, on the other hand, to serve, by their interaction with the holes made in the lateral walls 20a and 20b of the adapter, as a spindle for the rotation of the blade 3 relative to the arm 1.

On the outside, the mechanical connector has a wall 11 called a cap which, in the first place, closes the front portion of the terminal piece 2 and acts as a screen to protect the components contained inside this terminal piece 2 and, in the second place, provides a well-crafted outer finish. The face opposite to the cap 11, that is to say oriented toward the inside, comprises orifices (not visible) for hydraulic and electrical connection with the corresponding elements of the hydraulic connector 30 and of the electrical connector 40.

The mechanical connector also comprises a second latching means which takes for example the form of a flexible tongue 14 extending longitudinally from this inner face, and which is designed to secure the hydraulic connector 30 to the mechanical connector 10 when it is attached thereto. The tongue 14 terminates in an appendage in the form of a tooth 15 which has a vertical face capable of interacting with a vertical bar 33 positioned on the hydraulic connector 30 so as to prevent an inadvertent uncoupling, this bar 33 thus forming a first means for latching the hydraulic connector 30. The tooth 15 also has an inclined face in order to allow it to be snap-fitted by elastic deformation on the tongue 14 on this bar 33 by a longitudinal translation during the assembly of the two pieces.

This inner face of the mechanical connector 10 comprises two hydraulic inlet orifices extended by inner distribution channels for the windshield washer liquid, which are designed to interact with the pipes 31 and 32 of the hydraulic connector 30 which provide it with liquid. These distribution channels (not shown in the figures) extend inside the mechanical connector 10 to emerge in line with supply ducts 12 of the tubes 6 for the spraying of the liquid by the blade. As indicated above, these tubes extend along the two edges of the blade 3 in order to spray the windshield washer liquid on the outbound and return journeys of the blade. The inner face of the mechanical connector also comprises orifices containing male pins 42 and 43 onto which female terminals supported by the mechanical connector 10 are fitted. This electrical connection provides the electrical power necessary for the operation of the heating element incorporated into the blade.

The hydraulic connector 30 takes the form notably of two pipes 31 and 32 positioned in parallel longitudinally and mechanically linked to one another by connecting bridges. These pipes 31 and 32 each comprise two sectors which extend in directions oriented angularly relative to one another, the junction between these sectors forming an elbow. Such a structure makes it possible to adapt the shape of the pipes 31 and 32 to the shape of the terminal piece 2 under which they are placed. On the inside, these pipes each comprise a springback or shouldered connector to which the flexible, windshield-washer-liquid supply hoses are fitted, which run along the arm 1 from the liquid reservoir. On the side of the mechanical connector, each of the pipes 31 and 32 has a cylindrical shape capable of being inserted into the orifice of one of the inner distribution channels of the mechanical connector. O-rings 36 are placed close to this outer end in order to provide the seal between the pipes 31 and 32 and the orifices of the distribution channels which they enter.

At its lower portion or in other words on a lower face, the hydraulic connector 30 comprises coupling means 37 designed to interact with corresponding supporting means on the electrical connector, in the configuration in which the electrical connector is supported by the hydraulic connector and attached to it before the coupling of the assembly to the mechanical connector 10. As shown in FIG. 3, the coupling means 37 consist of a loop or an arch closing on the lower face of the hydraulic connector 30, and in which the body of the electrical connector 40 is inserted. Means for immobilizing the electrical connector in longitudinal translation on the hydraulic connector 30 may also be used so as to prevent the withdrawal of the electrical connector after it has been put in place. It is quite clear that any other method of coupling the electrical connector 40 to the hydraulic connector 30, or even an absence of coupling, the latter then being carried out directly on the mechanical connector, may be envisaged without departing from the scope of the invention.

Laterally, the hydraulic connector 30 comprises two protuberances which develop or extend from each of the pipes 31 and 32. These protuberances take the form of bars 33 extending for example perpendicular to the direction of extension of the pipe and each terminate in a disk sector or bearing surface 35. The latter notably has the shape of an angular sector of a circular plate placed in a plane perpendicular to that of the bar 33. It will be noted that, in this exemplary embodiment, the bar 33 which forms the link between the pipe and the disk sector also forms the first latching means mentioned above. Alternatively, the bar of the latching means and the bar forming the link between the pipe and the disk sector may be separate, in other words distinct. Finally, on the inside, the hydraulic connector supports a gripping means or push-button 5 of cylindrical shape with a triangular section, of which one of the faces extends perpendicularly to the axis of the pipes 31 and 32 in their sector of insertion into the mechanical connector so as to allow, by a pressure exerted longitudinally on this push-button 5, the insertion of the pipes 31 and 32 into the distribution channels of the mechanical connector.

As shown, the electrical connector 40 comprises a body which is inserted into the coupling means 37. The electrical connector also receives a sealing device 41 slipped onto the body. This sealing device 41 provides the sealing of the electrical connection between the electrical connector and the mechanical connector. The body 40 is pierced longitudinally with two hollow tubes in which metal connectors are positioned providing the electrical connection between the power-supply wires (not shown) originating from the passenger compartment via the arm 1 and the male pins 42 and 43 which provide the electrical connection with the electrical circuit inside the mechanical connector 10 which passes through it to reach the heating resistances of the scraper blade.

Figure 4:
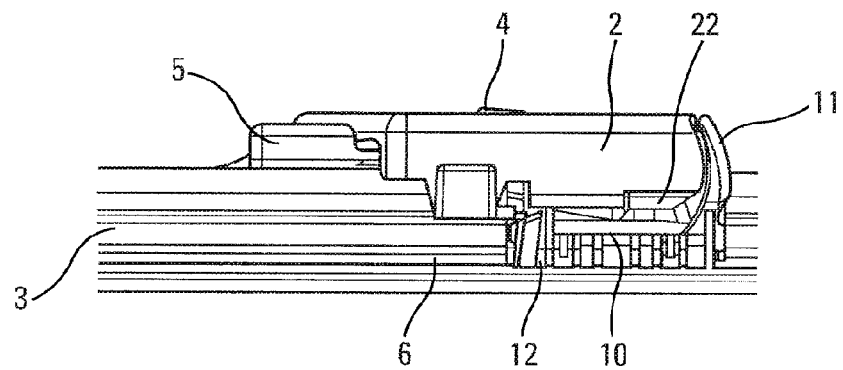
FIG. 4 is a rear view of the connection of FIG. 2, the windshield wiper being in the position of use.
Figure 5:
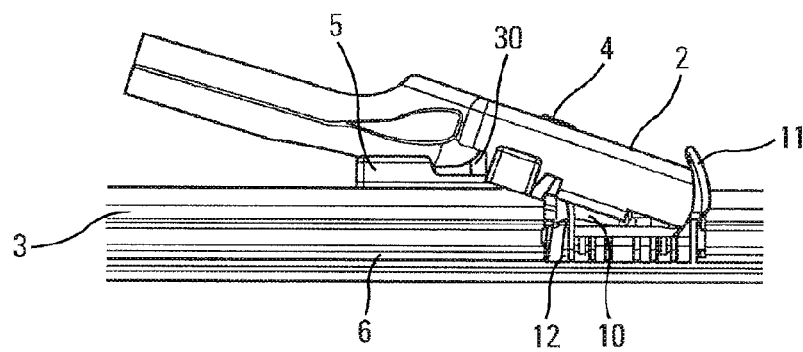
FIG. 5 is a rear view of the connection of FIG. 2, the windshield wiper being in the position of service.

With reference now to FIGS. 4 and 5, they show the blade 3 fitted to the arm, according to the invention, respectively in the position of use and in the position of service. The angular orientation between the position of use and the position of service is between 5° and 25°.

In FIG. 4, the blade 3 is aligned with the arm 1 which presses it against the glazing element to be wiped. On the other hand, in FIG. 5, the blade has been separated from the arm by an angle sufficient to provide access both to the hydraulic and to the electrical connection elements and to allow, by their separation from the adapter 20, either the installation, or the removal of the blade 3 and of its mechanical connector from the arm 1. During such a removal operation, the hydraulic connector 30 remains attached to the arm 1 and to its flexible hoses for supplying the windscreen-washer liquid, as does the electrical connector which remains connected to the power supply wires originating from the passenger compartment, while the mechanical connector moves away from it with the blade 3.

Figures 6, 7:
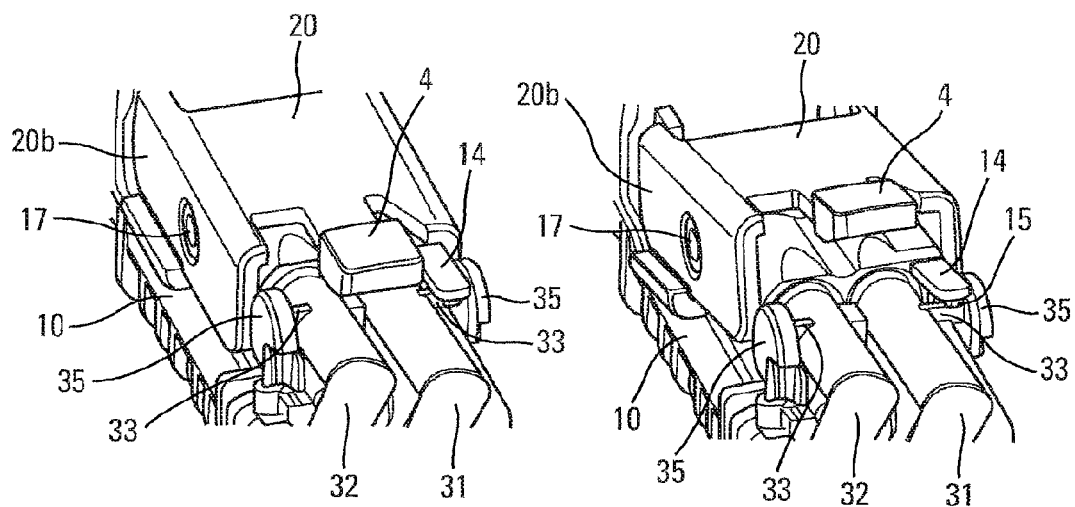
FIG. 6 is a view of the connection between the adapter of the windshield wiper and the hydraulic connector according to the invention, in the position of use.
FIG. 7 is a view of the connection between the adapter of the windshield wiper and the hydraulic connector according to the invention, in the position of service.

FIGS. 6 and 7 show the connection of the pipes 31 and of the hydraulic connector 30 to the mechanical connector 10, respectively in the position of use and in the position of service. The pipes 31 and 32 are pushed into the orifices of the inner windshield-washer liquid distribution channels formed in the mechanical connector 10, the O-rings 36 (that can be seen in FIG. 3) providing the seal. In FIG. 6, the adapter 20 is folded onto the mechanical connector. In other words, the adapter 20 is aligned with the mechanical connector. The second latching means is engaged on the first latching means, notably when the tongue 14 is in the low position, so that its terminal tooth 15 interacts with the bar 33 and holds the hydraulic connector 30 assembled on the mechanical connector 10. On the other hand, in FIG. 7, the adapter 20 is oriented angularly by mechanical connector 10 and is held away from the latter. The tongue 14 is raised, as will be explained below, and releases the bar 33, therefore allowing the separation of the hydraulic connector from the mechanical connector.

Figure 8:
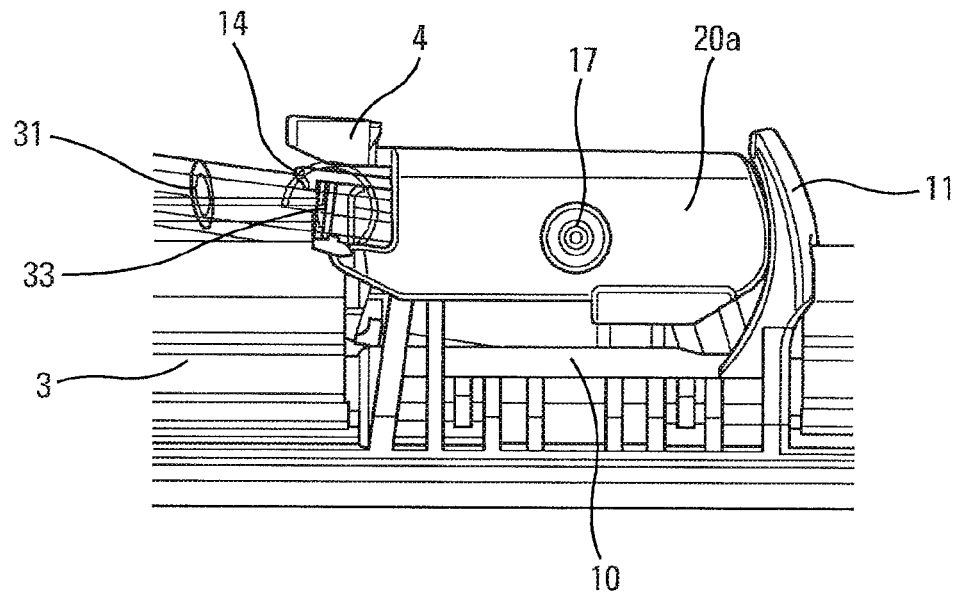
FIGS. 8 and 9 are views of a windshield wiper according to the invention in two successive positions, during the disassembly of a hydraulic connector from a mechanical connector.
Figure 9:
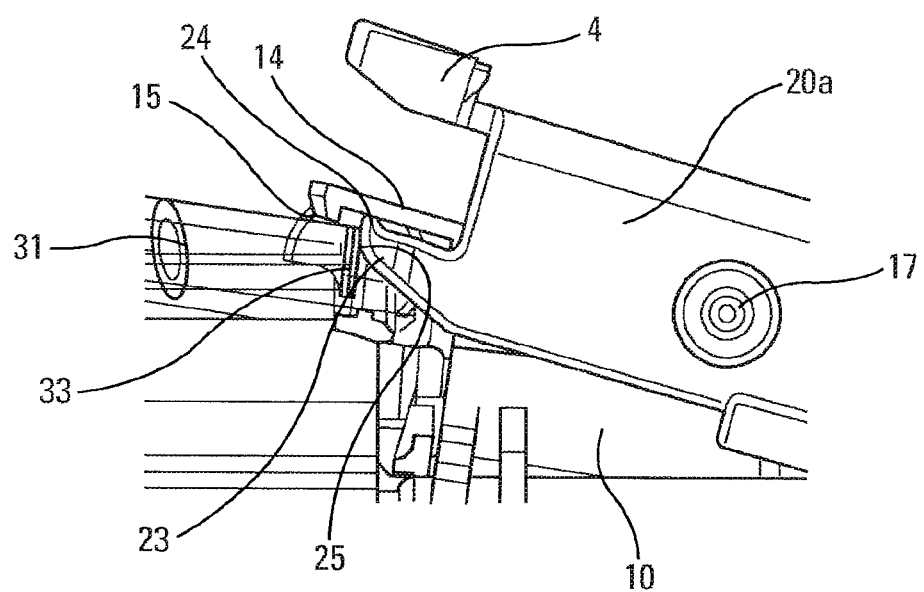

FIGS. 8 and 9 show the uncoupling of the hydraulic connector and of the mechanical connector during the transition from the position of use to that of service.

In FIG. 8, corresponding to the position of use, the adapter 20 is folded onto the mechanical connector and the tooth 15 of the flexible tongue 14 passes behind the bar 33, securing or latching the hydraulic connector 30 with the mechanical connector 10. In the position of service shown in FIG. 9, the adapter 20 has been turned until a finger 23 extending longitudinally in the low portion of its side 20a on the side on which the tongue 14 is positioned, raises the tongue 14 in order to uncouple to the tooth 15 from the bar 33. This finger has a free end in the form of a hook 24 and it is the end of this hook which rests on the tongue 14 so as to raise it. This finger 23 therefore forms a means for unlatching the second latching means, in particular by raising the tongue 14. The finger also comprises an extraction face 25 the function of which is to uncouple the hydraulic connector 30 from the mechanical connector 10. This extraction face is formed by the end face of the free end of the finger 23. While the hook 24 raises the tongue 14, this end face 25 rests against the bar 33 during the transition from the position of operation or of use to the position of service. Such a function makes it easier for an inexperienced user to remove the hydraulic connector. The hydraulic connector 30 is then free and can be separated from the mechanical connector 10 by exerting an inwardly-directed longitudinal pull on the latter.

The replacement of a blade on a windshield wiper arm comprising a hydraulic connector according to the invention will now be described.

The arm 1 is fitted with two flexible windshield-washer-liquid supply hoses which run along the lower face of the arm 1 and of the base 2c of the terminal piece 2 originating from the liquid reservoir, and which are connected to the hydraulic connector at springback connectors of its pipes 31 and 32. The hydraulic connector is relatively free with respect to its positioning beneath the terminal piece 2 of the windshield-wiper arm, since it is held only by the two flexible hoses. Its alignment with the longitudinal axis is therefore not guaranteed.

The operator begins by attaching the blade 3 to the arm 1 while bringing the mechanical connector 10 furnished with the adapter 20 level with the terminal piece 2, by placing it angularly in a position corresponding to that of the position of service. He assembles the adapter 20 onto the terminal piece 2 by inserting it into the inner volume of the latter and by applying to it a translation movement in the longitudinal direction until the abutments placed in the low position of their respective sides make contact. It then remains to provide both the hydraulic and the electrical connection between the mechanical connector 10 and the hydraulic connector 30 and electrical connector 40.

Since the respective angular position of the adapter 20 and of the mechanical connector 10 is still that corresponding to the position of service, the operator presses longitudinally on the push-button 5 of the hydraulic connector 30 in order to bring the pipes 31 and 32 closer to the inner face of the mechanical connector 10. When this is being done, the protuberances 35, notably the contact surfaces or disk sector, come into contact with the inner face of the lateral branches to 2a and 2b of the terminal piece and force the hydraulic connector to become positioned in a laterally centered manner relative to the terminal piece 2. The operator can, by use of the button 5, also align the hydraulic connector with the inner face of the mechanical connector 10 in the vertical plane, which causes the pipes 31 and 32 to be placed in the axis of the orifices into which they must be inserted. In other words, the operator does not have to find the insertion position on two axes, as in the prior art, but only on one axis which is characterized by a rotary movement about an axis passing through the center of the two protuberances. The pressure of the operator is sufficient, by pushing the pipes 31 and 32 into these orifices, to ensure a sealed connection between the mechanical connector 10 and the hydraulic connector 30. This pressure continues until the pipes reach abutment in the corresponding ducts of the mechanical connector, that is to say in a position in which the tooth 15 of the flexible tongue 14 is longitudinally beyond the bar 33 of the hydraulic connector 30. The operator can then close the terminal piece 2 back over the blade 3, passing from the position of service to the position of use. Moreover, the snap-fitting of the tooth 15 secures the hydraulic connector to the mechanical connector.

With respect to the electrical connector 40, its attachment to the hydraulic connector, with which it is aligned by virtue of the arch 37, automatically causes its correct alignment with the mechanical connector 10 and causes the correct positional placement of the female connectors belonging to the electrical connector 40. In other words, these female connectors are aligned on the pins 42 and 43 of the mechanical connector 10 into which they must be inserted.

In the opposite direction, the transition from the position of use to the position of service ensures, as indicated by FIG. 9, the disengagement or unlatching of the second latching means 15. Thus, the unlatching means, under the action of the finger 23, returns to the hydraulic connector its freedom relative to the mechanical connector by releasing the tooth 15 from the bar 33. It thus allows the operator to remove the blade 3 from the arm 1.

The invention has been described for a windshield-wiper blade of the flat blade type with two spray tubes 6, that is to say with two pipes on the hydraulic connector 30. It is quite clear that it could just as well be applied in the case of a hydraulic connector comprising only one pipe. Similarly, the latching system using a tooth 15 which is positioned on a tongue 14 attached to the adapter 20 and interacting with a bar 33 supported by the hydraulic connector 30 may be replaced by a tongue supported by the hydraulic connector and a bar supported by the mechanical connector.

The invention claimed is:

1. A connection device of a wiper system, comprising:
a terminal piece positioned at the end of an arm designed to move a blade over the surface to be wiped;
a blade;
a mechanical connector attached to said blade for attachment of the blade to the arm by an adapter, said adapter being inserted between the arm and the mechanical connector to allow a rotation of the mechanical connector relative to the arm between a position of use and a position of service, wherein the blade is attached to the arm in a longitudinal movement relative to said arm; and
a hydraulic connector, comprising at least one pipe operatively connected to the mechanical connector for carrying a liquid to the blade through the mechanical connector, and at least one protuberance capable of resting on an element of the terminal piece in order to align the hydraulic connector on the mechanical connector during said longitudinal movement.

2. The device as claimed in claim 1, wherein the protuberance extends laterally from the pipe.

3. The device as claimed in claim 2, comprising two protuberances situated on either side of said pipe.

4. The device as claimed in claim 1, wherein the protuberance has the shape of a disk sector extending in a plane parallel to a direction of extension of said pipe.

5. The device as claimed in claim 4, wherein the protuberance is linked to said pipe by a bar extending in a plane perpendicular to said pipe.

6. The device as claimed in claim 5, wherein said bar is oriented to form a first means of latching the hydraulic connector to the mechanical connector, capable of interacting with a second latching means positioned on said mechanical connector.

7. The device as claimed in claim 1, further comprising a push-button comprising a face oriented perpendicularly to the direction of said pipe.

8. The device as claimed in claim 1, further comprising a means for supporting an electrical connector maintaining the relative orientation of the latter relative to the hydraulic connector during its connection with said mechanical connector.

9. The device as claimed in claim 1, wherein the mechanical connector supports a second latching means capable of interacting with a first latching means positioned on said hydraulic connector to secure the hydraulic connector with the mechanical connector in the position of use.

10. The device as claimed in claim 9, wherein the first latching means is a bar which extends in a plane perpendicularly to a direction of extension of said pipe, and the second latching means is a tooth positioned at the end of a flexible tongue extending from the mechanical connector.

11. The device as claimed in claim 9, wherein the adapter comprises a means for unlatching the second latching means arranged to separate the hydraulic connector from the mechanical connector during the rotation of said adapter from the position of use to the position of service.

12. The device as claimed in claim 11, wherein the unlatching means is a finger extending from the lower face of the adapter and situated, in the position of use, beneath the second latching means.

* * * * *